US007107406B2

(12) United States Patent
Kurasugi

(10) Patent No.: US 7,107,406 B2
(45) Date of Patent: Sep. 12, 2006

(54) METHOD OF PREFETCHING REFERENCE OBJECTS USING WEIGHT VALUES OF REFERRER OBJECTS

(75) Inventor: Toshiyasu Kurasugi, Tokyo (JP)

(73) Assignee: NEC Corporation, (JP)

( * ) Notice: Subject to any disclaimer, the term of this patent is extended or adjusted under 35 U.S.C. 154(b) by 455 days.

(21) Appl. No.: 10/166,604

(22) Filed: Jun. 12, 2002

(65) Prior Publication Data

US 2002/0194434 A1 Dec. 19, 2002

(30) Foreign Application Priority Data

Jun. 13, 2001 (JP) ............................. 2001-178812

(51) Int. Cl.
*G06F 12/00* (2006.01)
(52) U.S. Cl. ...................... 711/137; 709/203
(58) Field of Classification Search ........ 711/113–146, 711/154, 162; 707/1–5, 10, 104.1, 202; 370/235, 370/29–230, 335, 346, 389, 395.41
See application file for complete search history.

(56) References Cited

U.S. PATENT DOCUMENTS

| 5,946,681 | A | * | 8/1999 | Shorter ........................... 707/3 |
| 5,963,945 | A | * | 10/1999 | Pal ............................... 707/10 |
| 5,983,322 | A | * | 11/1999 | Arimilli et al. .............. 711/128 |
| 6,023,726 | A | * | 2/2000 | Saksena ....................... 709/219 |
| 6,026,413 | A | * | 2/2000 | Challenger et al. ......... 707/202 |
| 6,055,572 | A | * | 4/2000 | Saksena ....................... 709/224 |
| 6,098,064 | A | * | 8/2000 | Pirolli et al. ................... 707/2 |
| 6,128,701 | A | | 10/2000 | Malcolm et al. |
| 6,161,102 | A | * | 12/2000 | Yanagihara et al. ........... 707/3 |
| 6,502,106 | B1 | * | 12/2002 | Gampper et al. ........ 707/104.1 |

* cited by examiner

*Primary Examiner*—Nasser Moazzami
*Assistant Examiner*—Hahem Farrokh
(74) *Attorney, Agent, or Firm*—Dickstein, Sharpiro, LLP.

(57) ABSTRACT

In a client-cache-server system, the weight value of a first object which is maintained in the cache and linked to a second object maintained in the server is determined. Based on the weight value, a decision is made as to whether prefetching is necessary. If the decision indicates that prefetching is necessary, the second object is prefetched from the server to refresh the cache. A further decision is made as to whether update enquiry is necessary based on the weight value. If the further decision indicates that update enquiry is necessary, a message is sent to the server for inquiring whether the first object has been updated in the server. If the server responds with a reply that indicates that the first object has been updated, the second object is prefetched from the server to refresh the cache.

43 Claims, 14 Drawing Sheets

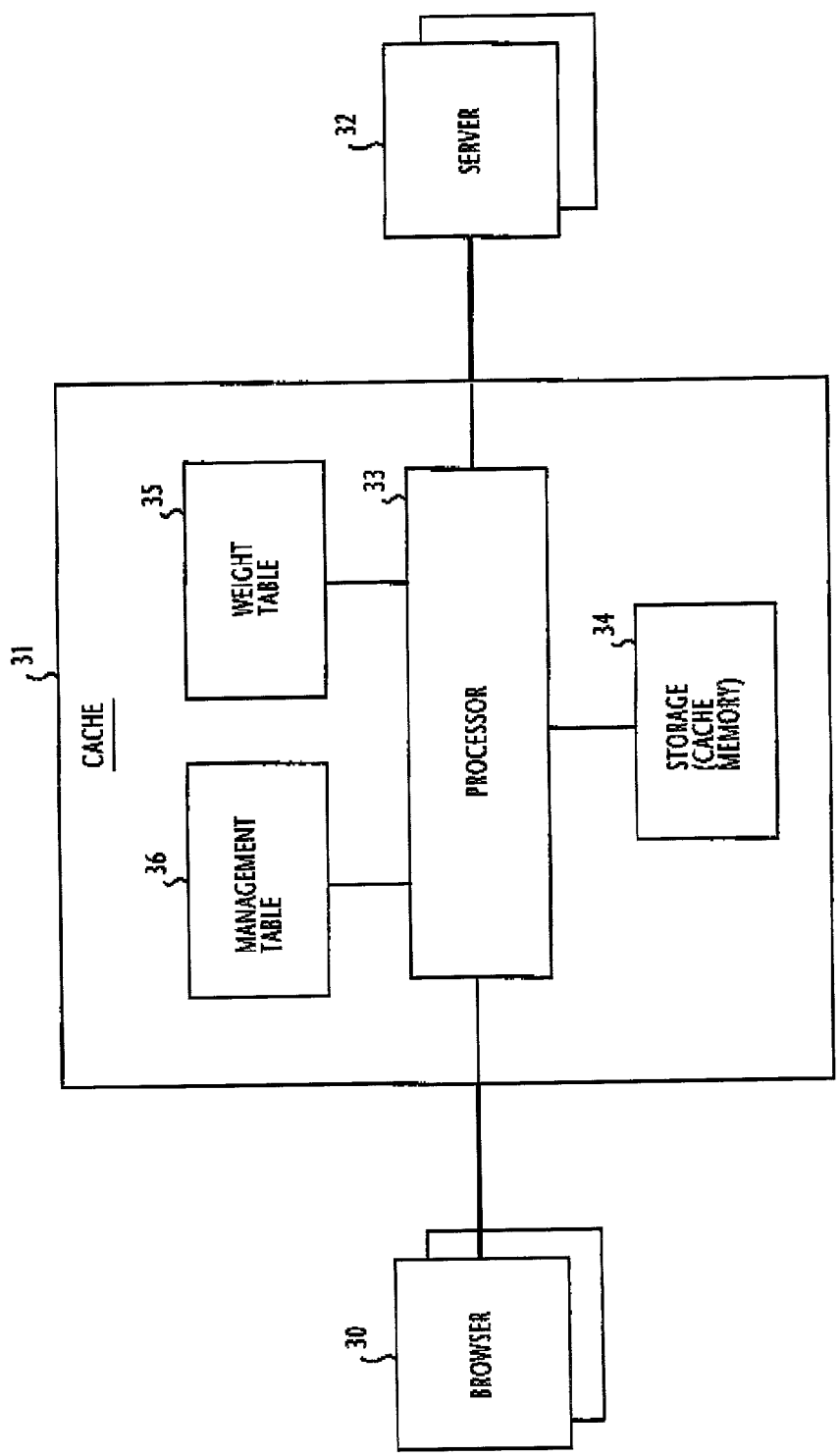

FIG. 5
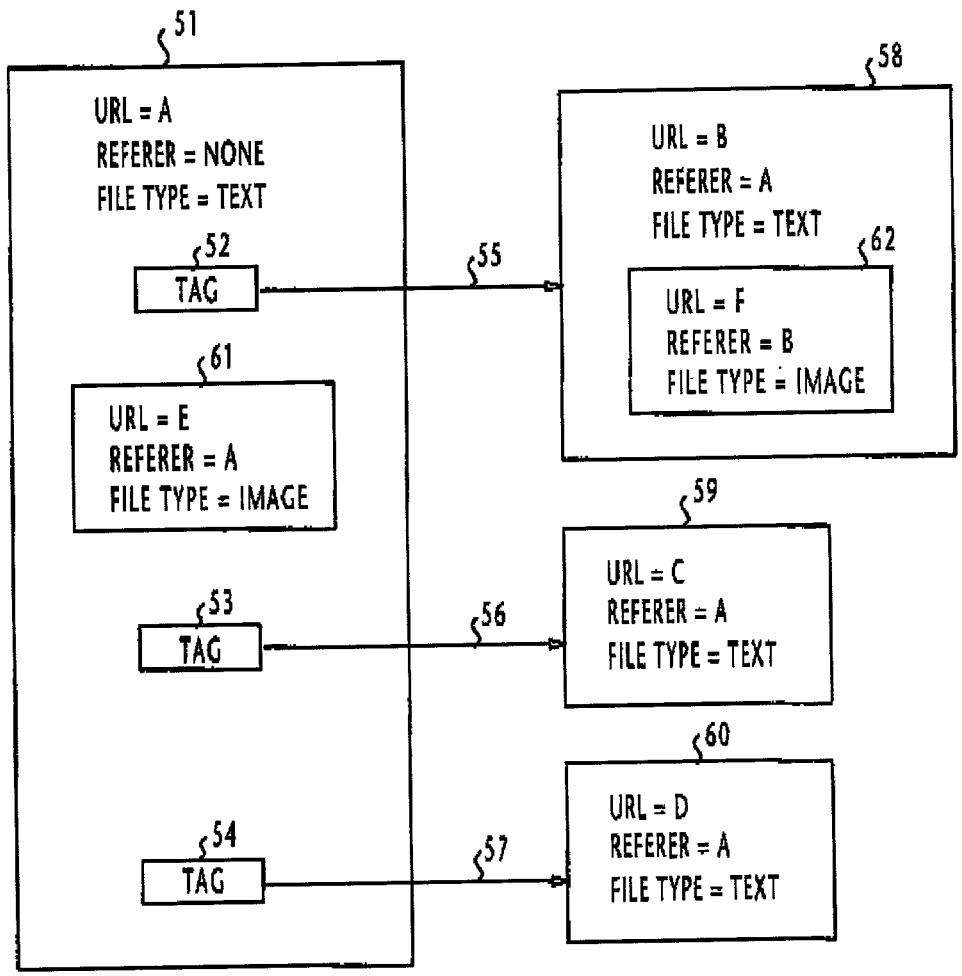
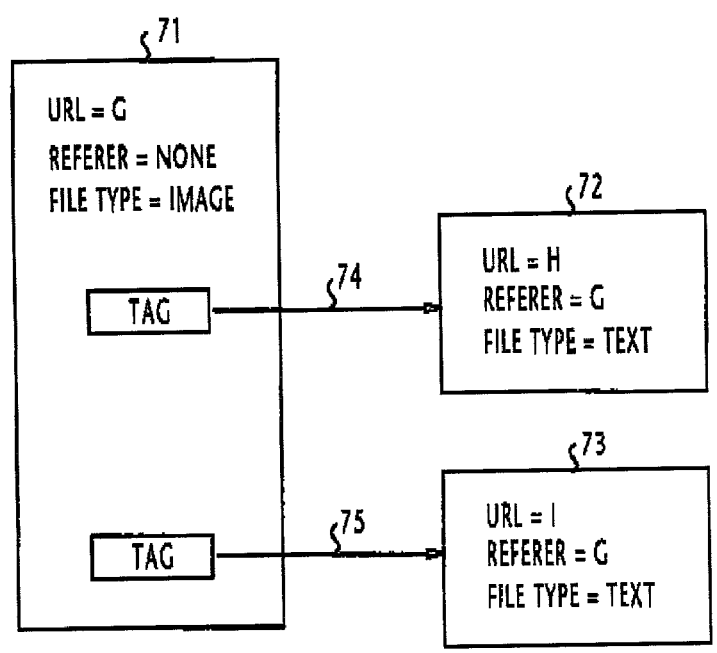

METHOD OF PREFETCHING REFERENCE OBJECTS USING WEIGHT VALUES OF REFERRER OBJECTS

BACKGROUND OF THE INVENTION

1. Field of the Invention

The present invention relates generally to cache refresh, and more specifically to a technique for predictably refreshing a cache by prefetching information from a server before that information is actually requested by a client.

2. Description of the Related Art

When a client seeks to obtain information from servers in a communications network, it is desirable to provide a cache that maintains copies of that information so that multiple requests for the same information can be obtained at the cache, eliminating the need to repeatedly transmit that information across the network. Communication bandwidth used between clients and servers can be reduced. One problem in the art is that information requested a second time by the same client, or by a second client after a first client has already requested that information can change at the server between the time it is first requested and the time it is requested again. In such instances, the information transmitted from the cache is inaccurate.

"Design and Implementation of Interactive Prefetching System on WWW", Ken-ici Chinen, et al., Computer Software Vol. 15, No. 2, pages 48–61, March 1998, describes a prefetching technique in which an object requested by a client is analyzed to detect hyperlinks and a preselected number of objects specified by the detected hyperlinks is prefetched from the server according to the order in which their requests have occurred.

Japanese Patent Publication 2000-148573 discloses a prefetching tool which uses keywords to extract hyperlink tags contained in HTML files retrieved from the WWW server. The keywords are set by users at a client device to indicate personal preferences and stored in the memory in a desired order of appearances. A list of URLs are stored in memory for indicating target objects to be prefetched. The prefetch tool makes a search through the URL list for detecting a corresponding keyword, and if there is one, prefetches an object specified by the hyperlink of the detected keyword. The order of prefetching is determined by the number of keywords used and the number of client's accesses to the hyperlinks.

In Japanese Patent Publication 1999-120069, a number of predetermined URLs are used to select a target object. This publication further discloses a prefetching operation that is performed based on keywords.

The prefetching technique disclosed in Japanese Patent Publication 1999-149405 involves selecting URLs that are frequently used by clients from a list of frequently accessed hyperlinks.

U.S. Pat. No. 6,128,701 discloses a cache refreshing method and system in which the prefetching performance is evaluated by using the theory of probability to calculate frequencies with which client requests occur and objects are updated.

However, one shortcoming of the prior art techniques is that there is a substantial number of instances in which the cache is repeatedly refreshed with the same information. Repeated wasteful actions would unnecessarily increase the communication bandwidth between the cache and the server and lead to an increase in system resources of proxy servers and Web servers.

Another shortcoming of the prior art, particularly, the keyword-based prefetching technique, is that difficulty would be encountered when identifying the keyword that best fits the need of the user since a single keyword may be linked to a number of objects of different contents. Further, the order of the keywords cannot objectively be determined and keywords are likely to be selected based on users' experiences. Thus, hyperlinks that are likely to be accessed by users cannot accurately be predicted from keywords.

A further shortcoming of the prior art, particularly, the prior art that is based on request frequency and update intervals, is that target objects can be selected only from the history of users' requests. Prefetching cannot be performed for objects whose records for requests are not available. Usually, the response time of a cache that users would feel tends to be aggravated by user's requests for information of the type that cannot be cached or the type that have never been cached. Generally, there are few instances in which objects once loaded is requested again. Therefore, user's feeling for cache response would be significantly improved if objects yet to be loaded are fetched in advance of possible user's request.

A still further shortcoming of the prior art is that due to the need to analyze loaded object data for selecting a target object in response to a request from a user, a substantial amount of time is taken from the instant the request is received to the instant the target object is selected.

SUMMARY OF THE INVENTION

It is therefore an object of the present invention to provide an efficient prefetching method and system to eliminate the need to increase the communication bandwidth between a cache and a server.

The stated object is attained by using the weight value of a referrer object (first object) as a decision threshold for making a decision as to whether prefetching is necessary for a reference object (second object) referenced by the referrer object by a hyperlink.

According to one aspect of the present invention, there is provided a method of operating a cache, comprising the steps of (a) determining a weight value of a first object maintained in the cache, the first object having a link to a second object maintained in a server, (b) making a decision as to whether prefetching is necessary based on the weight value, and (c) if the decision of step (b) indicates that prefetching is necessary, prefetching the second object from the server.

According to a second aspect, the present invention provides a method of operating a cache, comprising the steps of (a) determining a weight value of a first object maintained in the cache, the first object having a link to a second object maintained in a server, (b) making a decision as to whether update enquiry is necessary based on the weight value, and (c) if the decision of step (b) indicates that update enquiry is necessary, sending an update enquiry message to the server and receiving a reply message therefrom, and (d) prefetching the second object from the server if the reply message indicates that the first object has been updated.

According to a third aspect, the present invention provides a method of operating a cache, comprising the steps of (a) responsive to a first request from a client device, making a decision as to whether prefetching is necessary based on a weight value of a first object maintained in the cache, the first object having a link to a second object maintained in a server, (a) if the decision of step (a) indicates that prefetching is necessary, prefetching the second object from the server, (c) incrementing the weight value in response to a second request from the client device, (d) making a decision as to whether prefetching is necessary based on the weight value, (e) if the decision of step (e) indicates that prefetching is necessary, prefetching the second object from the server, and (f) repeating steps (a) to (e).

BRIEF DESCRIPTION OF THE DRAWINGS

The present invention will be described in detail further with reference to the following drawings, in which:

FIG. 3 is a block diagram of a generic client-cache-server system;

FIG. 5 is a schematic diagram illustrating a typical example of referrer objects and reference objects linked from the referrer objects;

DETAILED DESCRIPTION

Before proceeding with the detailed description of the present invention, reference is first made to FIGS. 1 to 4 to provide an explanation of the prior art WWW (World Wide Web) service in which hyperlinks are used to prefetch web documents from a web server connected to the Internet. The web documents are maintained and served to the user in units called "objects" which are identified by such identifiers as URL (Uniform Resource Locator).

Figure 1:
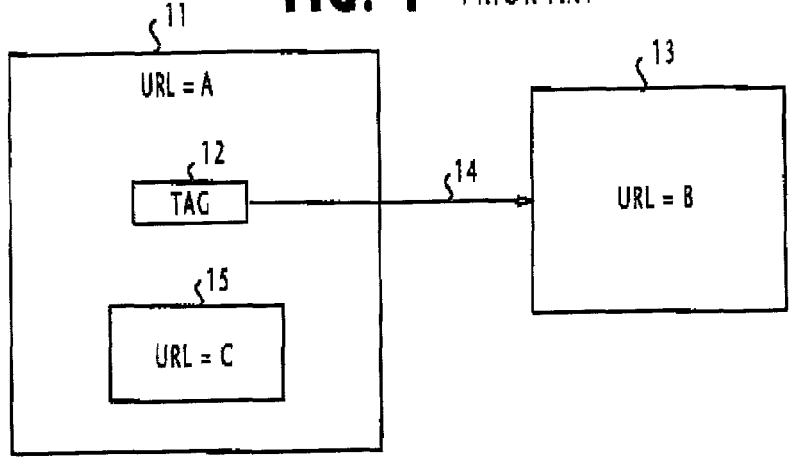
FIG. 1 is a schematic diagram of referrer and reference objects linked by a hyperlink and an object embedded in the referrer object.

As shown in FIG. 1, each web object such as an object 15 (URL=C) is embedded in another web object 11 (URL=A) which bears a relationship to a web object 13 (URL=B) via a hyperlink 14. The hyperlink 14 is embedded within the object 11 as a hyperlink tag 12. With the web object 11 being downloaded, a user's click action on the hyperlink tag 12 causes the object 13 to be downloaded. Note that the linked objects may be located within a same server or separately on local and remote servers.

Figure 2A:
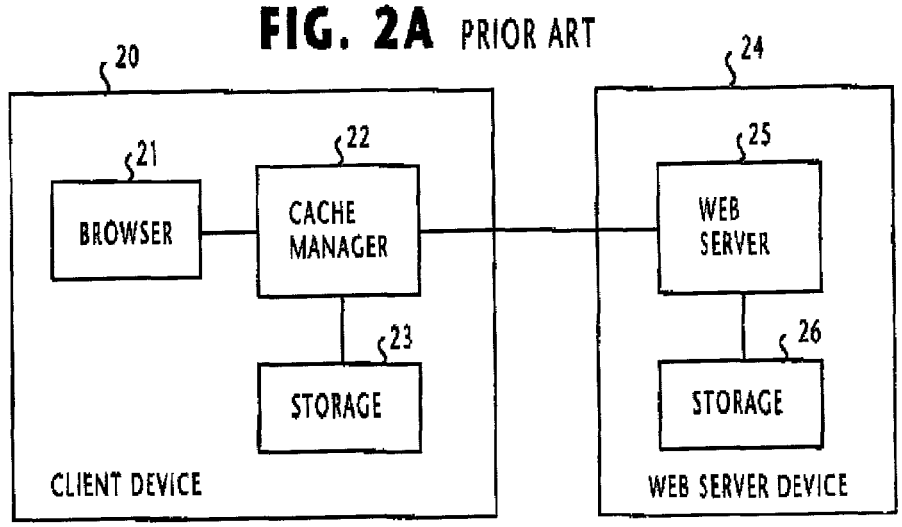
FIG. 2A is a schematic diagram of a known system in which a client device is directly connected to a server for illustrating a first form of the browser-cache-server relationship.

As shown in FIG. 2A, users at a client device 20 directly download web documents on a browser 21 from a web server device 24. This is done by the user specifying the web object by an URL in a request and sending it from the browser to a cache manager 22 of the client device. Cache manager 22 responds to the request by making a search through its mass storage 23 for the web object. If the web object is present in the storage 23, the cache manager 22 transmits the web object to the browser 21 from the storage 23. If the web object is not present, the cache manager 22 transmits a request specifying the object by the same URL through a communication path to the web server 25 of the web server device. Web server 25 retrieves the web object from its mass storage 26 and transmits it to the cache manager 22 through the communication path. The web object received at the client device is loaded into the storage 23 and a copy of the object is transmitted to the browser 21 at the same time.

Figure 2B:
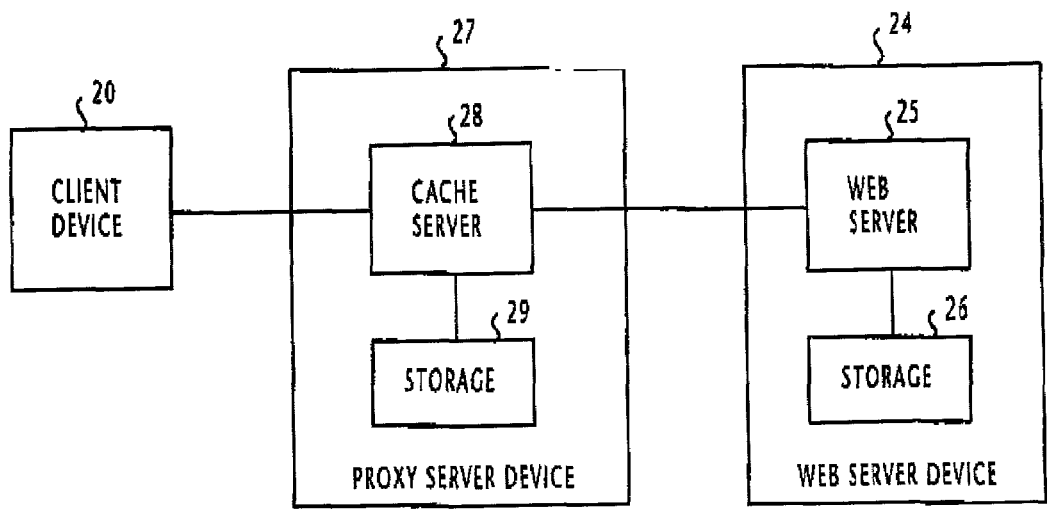
FIG. 2B is a schematic diagram of a known system in which a client device is connected via a proxy server to a server for illustrating a second form of the browser-cache-server relationship.

Web objects are downloaded in another system, as shown in FIG. 2B, in which a proxy server device 27 is provided between client device 20 and web server device 24. If the web object is not present in the storage 23 of the client device, the cache manager 22 transmits a request to the cache server 28 of the proxy server device. Cache server 28 searches through its own storage 29 for the web object. If the web object is present, the cache server 28 retrieves the web object from the storage 29 and transmits it to the cash manager 22. If the web object is not present at the proxy server device, the cache server 28 transmits a request to the web server 25. Web server 25 searches through its own storage 26 for the web object. If it is found, the web server 25 retrieves it from the storage 26 and transmits it to the cash server 28. The web object received at the proxy server device is loaded into the storage 29 and a copy of the object is transmitted to the client device, where the object is loaded into the storage 23 and a copy of the object is transmitted to the browser 21 at the same time.

Since the cache may be located both in the client device and the proxy server device or located only in the proxy server, the terms "browser", "cache" and "server" refer to a relationship between client, proxy server or web server and a cache, to logical entities, not necessarily to particular physical devices.

FIG. 3 is a generic representation of a relationship between a browser 30 (client), a cache 31 and a server 32 in an environment in which cache is located in both the client device and proxy server device or an environment in which cache is provided in only the proxy server.

Cache 31 includes a processor 33 connected between the browser 30 and the sever 32 via communication paths which are established in an IP (Internet Protocol) network. Processor 33 is associated with a storage device 34 (including cache memory) in which web documents are cached. Processor 33 is further associated with a weight table 35, which maintains weight values of "referrer" objects linked to "reference" objects. A management table 36 is provided for the management of identifiers.

When the user at the client device clicks on a hyperlink of a referrer object, the processor 33 performs prefetching of the data of a reference object of that referrer object from the server 32 in order to reduce the response time which the server takes to transmit a requested Web document.

Prior to the prefetching operation, the processor 33 determines a weight value of the referrer object, and based on the weight value of the referrer object, makes a decision as to whether or not the reference object is to be prefetched. If the weight value is higher than a predetermined value, the reference object is prefetched from the server. Specifically, the weight value of the referrer object is determined by the frequency at which the user clicked on the hyperlink of that object.

Figure 4:
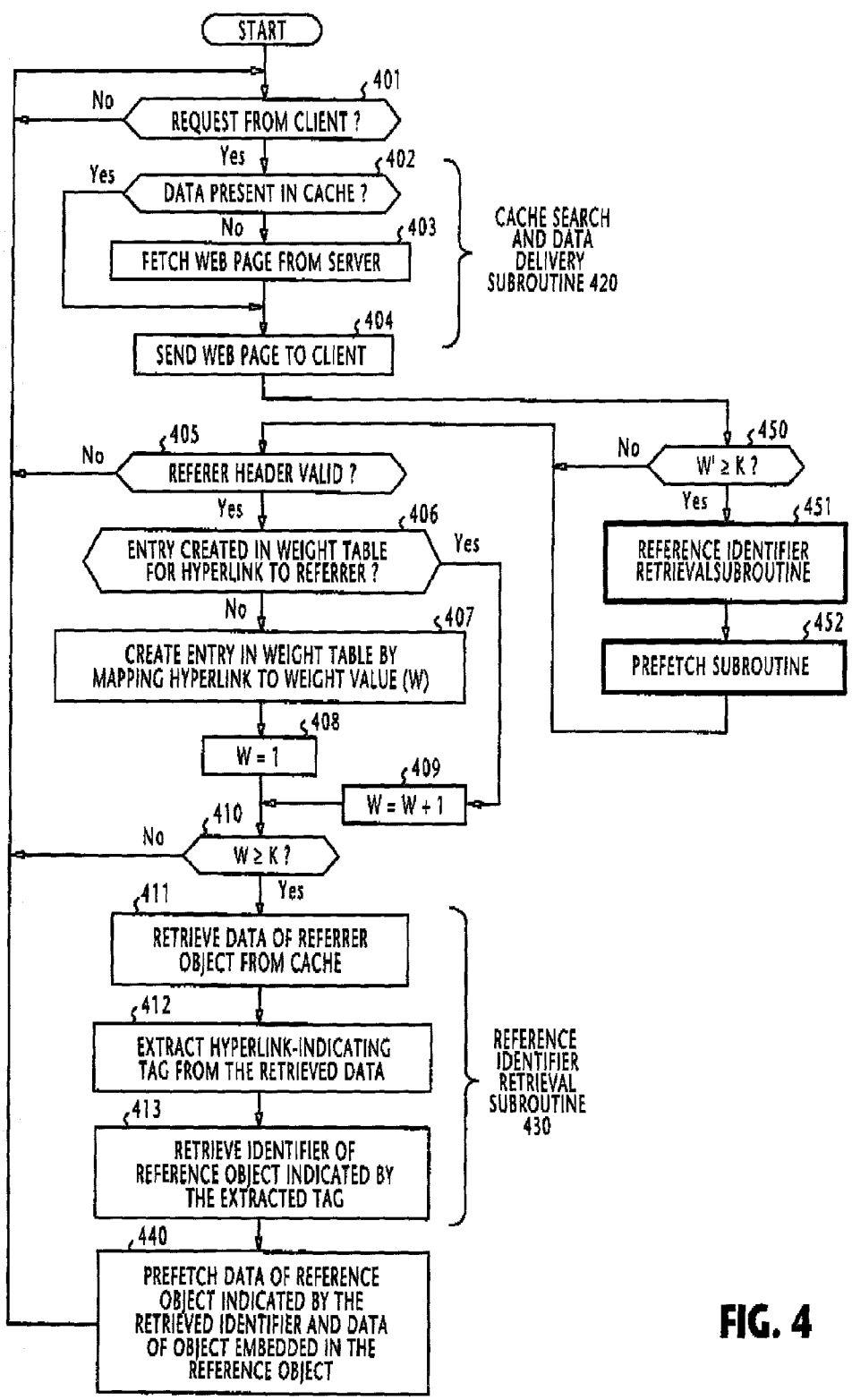
FIG. 4 is a flowchart of the operation of a cache processor according to one embodiment of the present invention.

The operation of the processor 33 according to one embodiment of the present invention proceeds according to the flowchart of FIG. 4.

In FIG. 4, the processor 33 receives a request from the browser 30 for a web object and extracts the URL identifier of the web object and other necessary information in a manner as will be described later (step 401) and performs a cache search and data delivery subroutine 420 by determining if that object is present in the cache memory 34 (step 402). If the web object is present in the memory 34, the processor 33 transmits the web object to the browser 30 (step 404). If the web object is not present in the storage 34, the processor 33 retrieves the web object from the appropriate server device 32 and stores the web object in the storage 34 (step 403), and transmits the web object to the browser (step 404) as in the case when the web object was originally present in the storage 34.

Following the execution of subroutine 420, the processor 33 proceeds to decision step 450 to determine if the weight value W' of the requested referrer object is equal to or higher than a specified value K. If not, flow proceeds to step 405, If W'≧K, the processor successively executes reference identifier retrieval subroutine 451 and prefetch subroutine 452 to prefetch a reference object of the requested referrer object. Note that subroutines 451 and 452 respectively correspond to subroutines 430 and 440, which will be described below. Following subroutine 452, flow proceeds to step 405.

At step 405, the processor 33 makes a decision as to whether there is a need to prefetch from the server 32 a reference object of the requested object, based on the URL identifier of the requested object and file type or other information contained in the URL identifier. When the client request a reference object by using the hyperlink of a referrer object, the referer header represents the identifier of the referrer object (usually identified by a URL). For example, if the client requested a web object 13 (URL=B) using hyperlink 14 (see FIG. 1), the referer header transmitted from the browser to the proxy server contains the identifier URL=A of the referrer object 11 (as specified by RPC2616 "Hypertext Transfer Protocol—HTTP/1.1").

In order to evaluate the weight value of a referrer object, it is necessary to identify the identifier of the referrer object of the requested object. However, the referrer object cannot be accurately identified exclusively by the referer header.

Assume that the client requested the web object 11 (URL=A) of FIG. 1, the browser retrieves the web document (data) of the requested object 11 from the cache. In succession, the browser automatically sends a request for the embedded object 15 (URL=C). However, the referer header of the subsequent request contains the same object identifier URL=A. Thus, the processor 33 cannot determine if the objects 11 and 15 are linked by an embedded link or by a hyperlink, and hence the referrer object cannot be identified only from the header of the client's request.

For this reason, the processor 33 extracts, at step 401, a file-type indication from the received request. Usually, image objects are embedded in a referrer object and indicated by such file extensions as "jpg" and "tiff", while text objects are reference objects linked by a hyperlink to a referrer object and indicated by such a file extension as "html". Processor 33 checks to see if the file extension is one of a specified group of file extensions including "html". If this is the case, the processor recognizes that the referer header is valid and that the user has clicked on a hyperlink of a referrer object and requested a reference object linked from that referrer object.

More specifically, as shown in FIG. 5, assume that the browser 30 has loaded a Web page containing a text object 51 (URL=A) which includes tags 52, 53 and 54 that link the object 51 by hyperlinks 55, 56 and 57 to text objects 58, 59 and 60 (URL=B, URL=C, URL=D), respectively. Image objects 61 (URL=E) and 62 (URL=F) are embedded in the text objects 51 and 58, respectively. A referrer-reference relationship thus exists between the object 51 as a referrer object and the objects 58, 59, 60 as reference objects. Since the object 51 is a text object having no hyperlinks to any referrer object, the http request of this object contains a text file extension, but contains no referrer URL. Since the object 58 is a text object having a link from the referrer object 51, the request of this object contains its referrer identifier URL=A and a file extension indicating that the object 58 is a text. The requests of objects 59 and 60 likewise contain a text file extension and the identifier of their referrer object 51.

On the other hand, the request of the embedded object 61 contains an image file extension and a URL identifier indicating that the object has an embedded link to the referrer object 51. Likewise, the request of the embedded object 62 contains an image file extension and a URL indicating that the object has an embedded link to the reference object 58. Since the objects 61 and 62 contain an image file extension, they are identified as "embedded" objects.

Therefore, if the referer header of a client's request is valid, the decision at step 405 is affirmative and flow proceeds to step 406 to make a decision as to whether a table entry has been created in the weight table 35 for a hyperlink that links the detected reference object to its referrer object. If no table entry has been created for the hyperlink, flow proceeds to step 407 to create a table entry in the weight table 35 by mapping the hyperlink to a weight value (W), which is initially set to 1 at step 408. If a table entry has already been created for the hyperlink to the referrer object, the routine branches out to step 409 to increment the weight value of the entry by one.

Following the execution of step 408 or 409, a decision is made at step 410 as to whether the weight value is equal to or greater than a predetermined threshold K. If the decision is negative at step 410, flow returns to the starting point of the routine.

If the decision is affirmative at step 410, flow enters a reference identifier retrieval subroutine 430 which begins with step 411 to retrieve data of the referrer object from the cache memory 34. At step 412, the processor 33 extracts the hyperlink-indicating tag from the retrieved data, and retrieves the identifier of the reference object indicated by the extracted tag (step 413).

Reference ID retrieval Subroutine 430 is followed by data prefetch subroutine 440 in which the processor prefetches the data (Web document) of the reference object from the server 32 indicated by the retrieved identifier along with the data of an object which may be embedded in the reference object such as the one shown at 62 in FIG. 5. Following the execution of data prefetch subroutine 440, the processor 33 returns to the starting point of the routine.

It is seen that by repeatedly executing the routine in response to the client's click on the embedded tag of a hyperlink, the weight value of the referrer object of the hyperlink is incremented and will eventually become significant if the user repeatedly clicks on the hyperlink. Thus, the decision at step 410 is negative as long as the weight value is lower than the significant level K. In this manner, fruitless prefetching attempts are eliminated.

While mention has been made of file extension as a means for determining the validity of referer header, "content-type" included in the entity header of the http protocol as specified in the above-mentioned RFC document can also be used. Processor 33 analyzes the relationships between referer headers and content-type and determines their corresponding relationships. If the request contains a specified content-type such as text/html, the referer header is recognized as a valid header.

The weight value of a referrer object downloaded to the browser can also be determined by the frequency at which the hyperlinks of the object is accessed by the client relative to the access frequency of the hyperlinks of other downloaded referrer objects, or the rank of the referrer object relative to the ranks of the other referrer objects.

Figure 6:
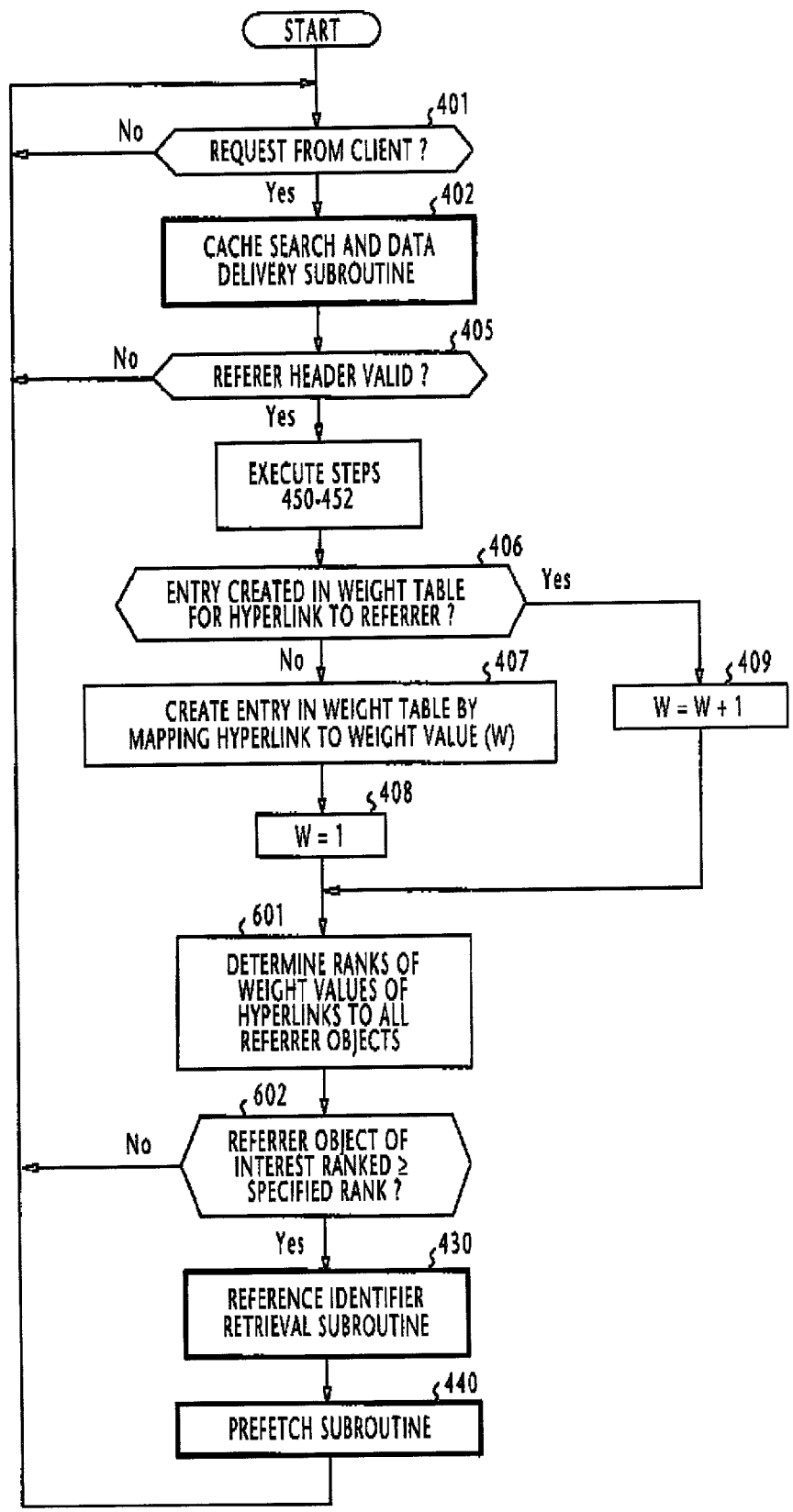
FIG. 6 is a flowchart of the operation of a cache processor according to a modification of the flowchart of FIG. 4.

The weight decision algorithm of FIG. 4 is modified to incorporate this ranking approach as shown in the flowchart of FIG. 6, in which the same numerals are used to designate corresponding parts as those used in FIG. 4 and the description thereof is omitted. FIG. 6 differs from FIG. 4 by the inclusion of steps 601 and 602. At step 601 following steps 408 and 409, the processor 33 retrieves weight values of all referrer objects associated with the browser 30 from the weight table 35 by arranging them in descending order of weight values and determines their ranks. At step 602, the processor makes a decision as to whether the rank of the referrer object of interest, i.e., the referrer object linked to that reference object detected at step 405 is equal to or higher than a specified rank. If the decision is negative, flow returns to step 401. If the decision is affirmative, flow proceeds to reference ID retrieval subroutine 430 to retrieve the identifier of the reference object.

In the example of FIG. 5, assume that the client has established a second referrer-reference relationship between a referrer object 71 (URL=G) and reference objects 72 and 73 (URL=H, URL=I) linked from the referrer object by hyperlinks 74 and 75, in addition to the first referrer-reference relationship described above. If the client has accessed hyperlinks 55, 56, 55 and 74 during a given time slot the weight table 35 will store access data indicating that the referrer object 51 has been accessed three times, while the referrer object 71 has been accessed once. If the highest rank is the specified rank (step 602), the referrer object of interest, i.e., referrer object 51 is determined to be ranked equal to the specified rank and the decision at step 602 is affirmative and the data of reference objects 58, 59 and 60 are subsequently prefetched. If the referrer object 71 is requested by the client, the processor 33 determines that it is ranked lower than the specified rank and hence no prefetching is performed. Note that by monitoring the traffic load of the network and altering the specified threshold rank of step 602 according to the monitored traffic, the network congestion can be prevented.

Figure 7:
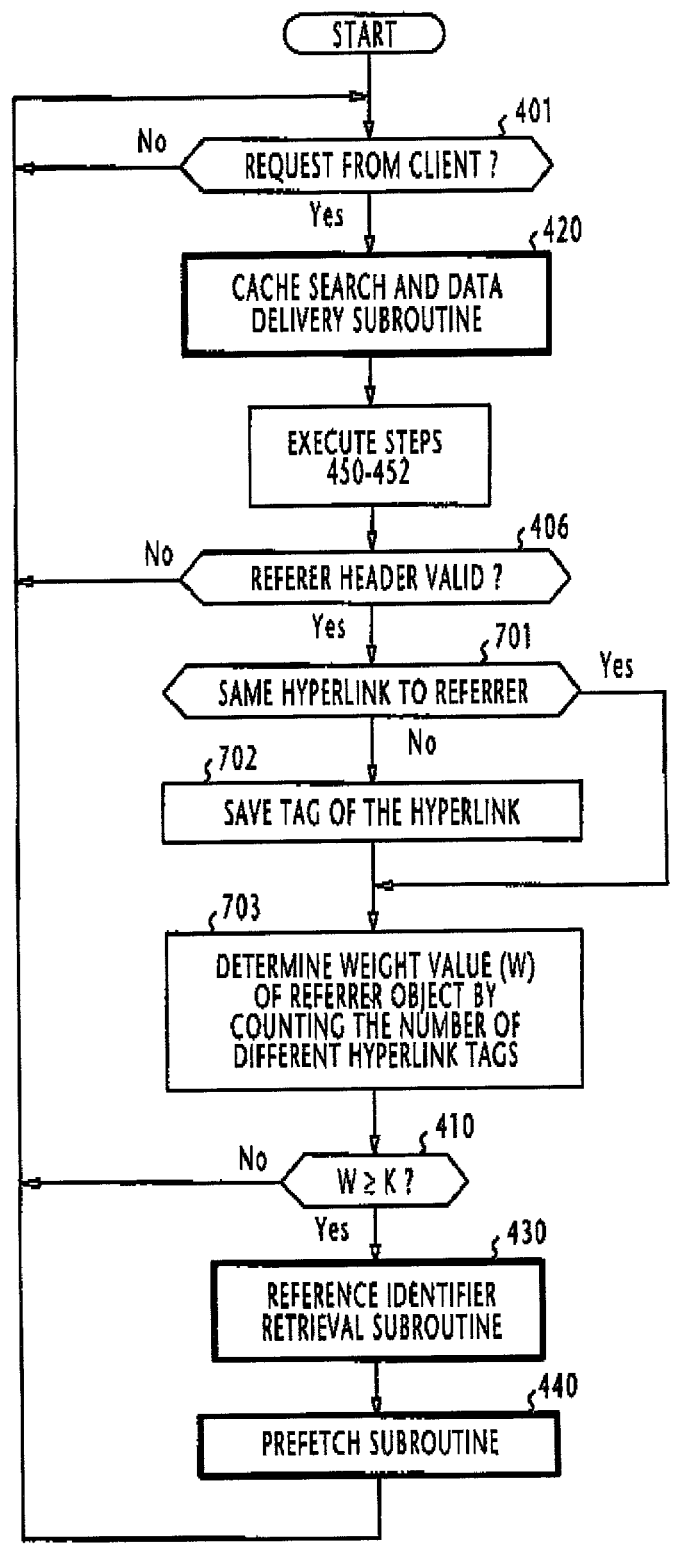
FIG. 7 is a flowchart of the operation of a cache processor according to a further modification of the flowchart of FIG. 4.

Another modification of the weight decision algorithm is shown in the flowchart of FIG. 7 in which steps 701, 702 and 703 are provided instead of steps 406 through 409. Following the affirmative decision at step 405, the processor determines, at step 701, whether the hyperlink tag of the reference object detected by step 405 is the same as the one that is saved in memory. If not, flow proceeds to step 702 to save the tag in memory, and determines the weight value W of the referrer object by counting the number of different hyperlink-indicating tags embedded in that referrer object and saved in memory (step 703). If the user has clicked on the tags of different hyperlinks, the number of such different hyperlinks is used to represent the weight value, Similar to the previous embodiment, the weight value is subsequently compared with the threshold value K at step 410 to determine if prefetching is necessary.

Figure 8:
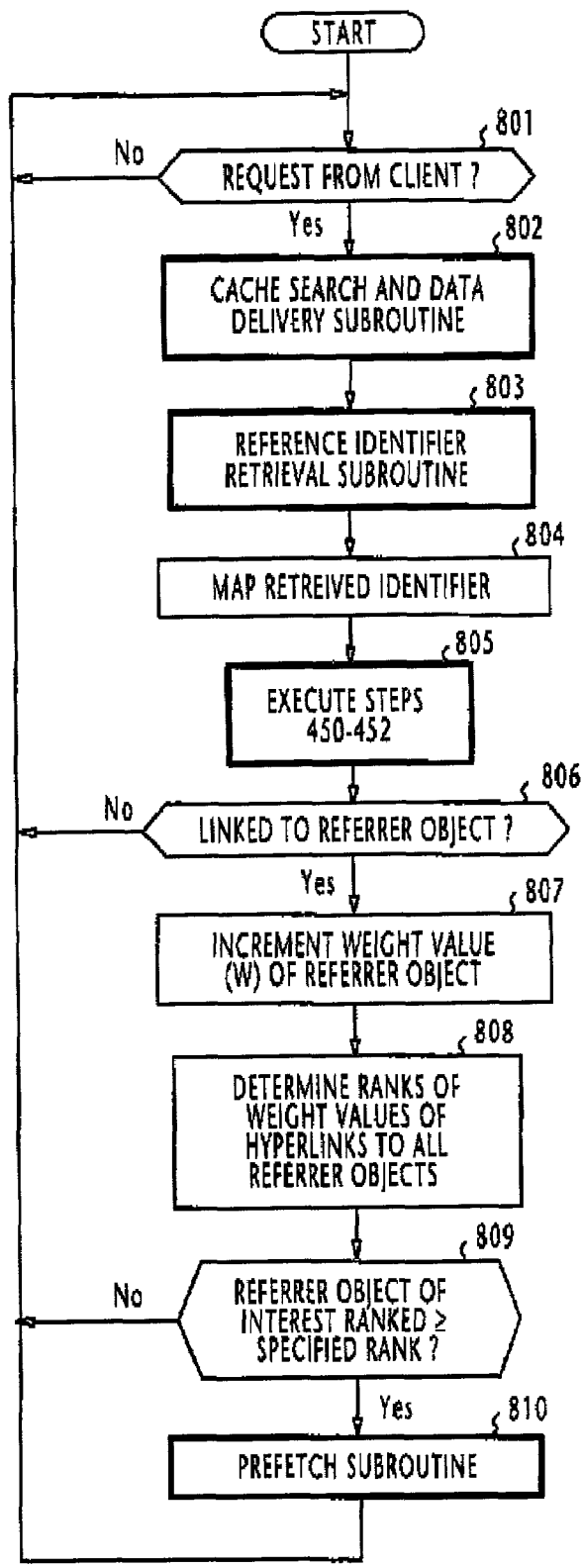
FIG. 8 is a flowchart of the operation of a cache processor according to a still further modification of the flowchart of FIG. 4.

A still further modification of the weight decision algorithm is shown in FIG. 8 in which data stored in the cache memory is used to identify the referrer object. In this modification, the cache memory 35 is used to retrieve the identifier of a reference object to identify its referrer object, instead of using the referer header.

Processor 33 receives a request from the client's browser at step 801 and extracts an object identifier from the request message and executes cache search and data delivery subroutine 802 and reference identifier retrieval subroutine 803 in a manner similar to that described in the previous embodiments. The identifier of the reference object is therefore extracted from the cache memory. At step 804, the identifier of the reference object is mapped to the identifier of the referrer object in the management table 36. In subroutine 805, steps 450 to 452 of FIG. 4 are executed. If the extracted reference object is linked from a referrer object (step 806), the processor branches to step 807 to increment the weight value of the referrer object. At step 808, ranks of the weight values of referrer objects of the client mapped in the management table 36 are determined and a decision is made, at step 809, as to whether the referrer object of interest is ranked equal to or higher than a specified rank. If the decision is affirmative at step 809, flow proceeds to prefetch subroutine 810.

Figure 9:
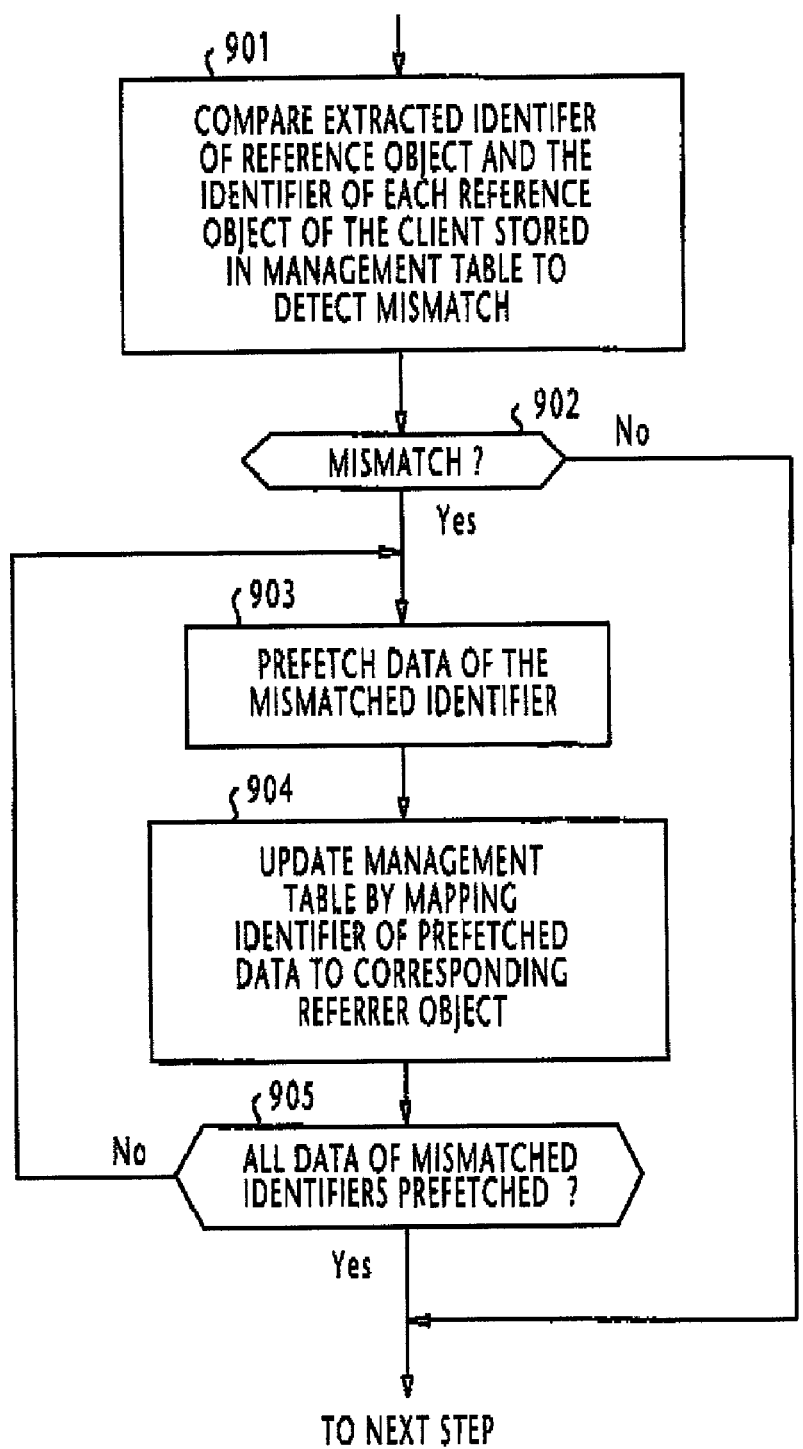
FIG. 9 is a flowchart of the operation of the processor showing details of prefetch subroutine.

Details of data prefetch subroutine of FIGS. 4, 6, 7 and 8 are shown in FIG. 9, in which the management table 36 is used to map the identifiers of the reference objects which have been prefetched from the server 32 to their referrer objects. At step 901, the reference object identifier extracted by the previous subroutine 430 is compared with each of the identifiers of reference objected stored in the management table 36 to detect a mismatch identifier. If no mismatch is detected (step 902), prefetching is not performed on the reference object and flow returns to the starting point of the routine. If at least one mismatch is detected, flow proceeds to step 903 to prefetch the data of the mismatched identifier from the server, and ten updates the management table 36 with the identifier of the prefetched data by mapping the identifier of the prefetched reference object as a "prefetch-free" identifier to the identifier of its referrer object (step 904). If more than one mismatch identifier is detected at step 902, steps 903 and 904 will be repeated until data of all mismatched identifiers are prefetched (step 905). As a result, the identifier of a reference object is added to the entry of its referrer object when the identifier of the reference object is not found in that entry.

If a plurality of identifiers are extracted by subroutine 430 such as identifiers URL=B, URL=C, URL=D of FIG. 5 linked from URL=A, more than two or more mismatches may be detected. In such instances, the processor may impose restrictions to a smaller number of identifiers on which prefetching is actually performed.

It is desirable that the document maintained in the cache memory is as fresh as possible and that the amount of time (i.e., response time) taken for the client to load a requested document is as short as possible. Therefore, when the server 32 has updated the referrer-reference relationship of a referrer object it is preferable that the cache 31 knows this fact as early as possible. This is accomplished by having the cache 31 send an update enquiry message to the server 32 at appropriate timing for a reply and having the cache prefetch fresh data from the server when the reply indicates that an update has occurred. A flowchart shown in FIG. 10 is one embodiment of this update enquiry and prefetching process.

Figure 10:
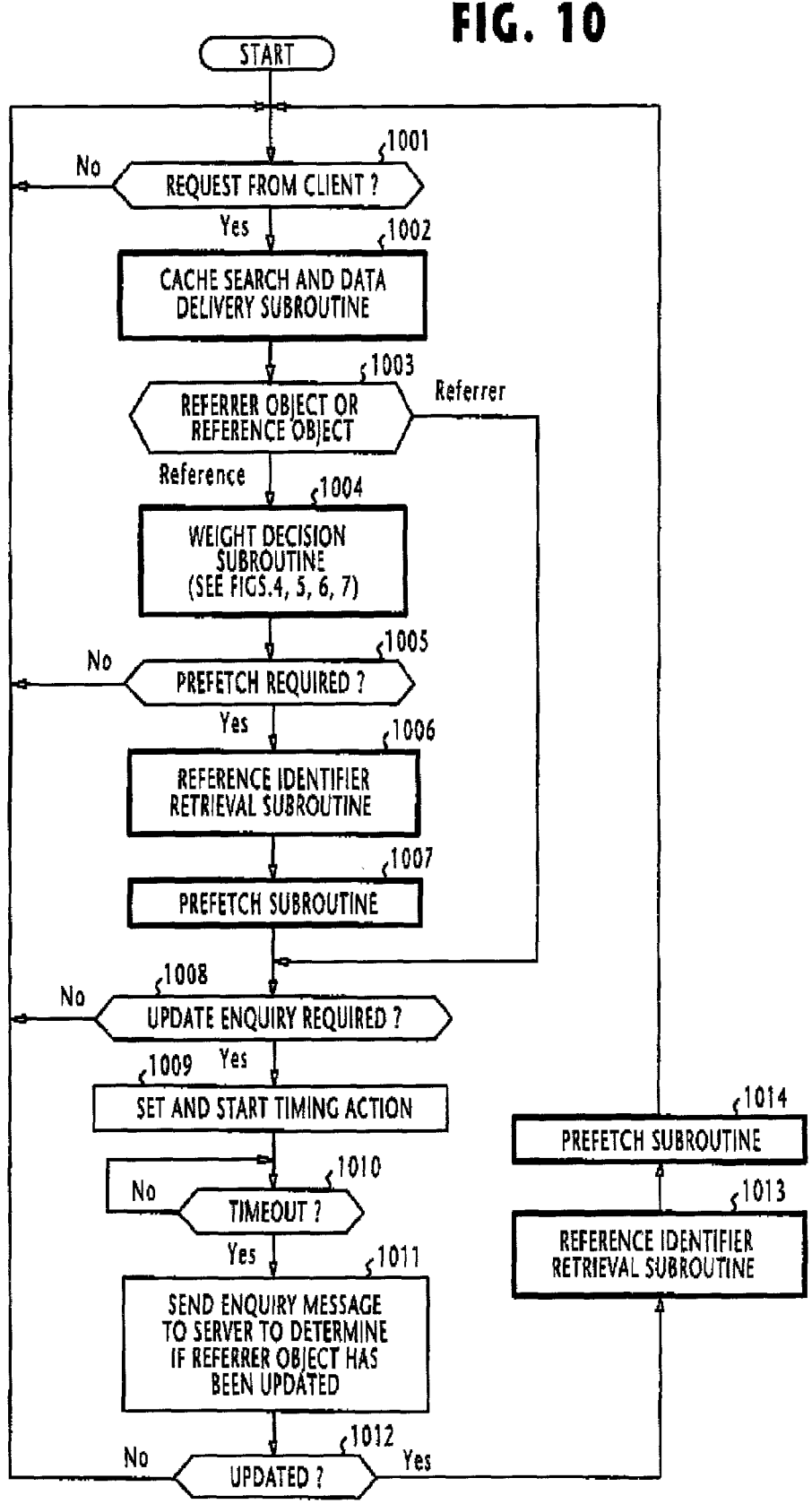
FIG. 10 is a flowchart of the operation of the processor according to a further embodiment of the present invention in which the cache sends an update enquiry message to the server in order to prefetch data if the server has updated object data.

In FIG. 10, the processor 33 receives a request from the browser at step 1001 to extract necessary information from the request message and performs cache search and data delivery subroutine 1002. At step 1003, the processor determines if the client requested a referrer object or a reference object that can identify its referrer object. If the reference object is detected at step 1003, the processor executes weight decision subroutine 1004 as discussed previously with reference to FIGS. 4, 5, 6 and 7, and flow proceeds to decision step 1005.

At step 1005, the processor makes a decision as to whether prefetching is required. If the weight value is higher than a specified threshold value, the identifier of the reference object is retrieved from the cache memory by executing the reference identifier retrieval subroutine 1006 as discussed previously and prefetches the data of the reference object from the server (subroutine 1007). At step 1008, the processor compares the weight value of the referrer object of the reference object with a specified threshold and determines that an update enquiry is necessary if the weight value is higher than the threshold. If a referrer object is detected at step 1003, the processor proceeds to step 1008 to compare its own weight value with a threshold and determines that an update enquiry is necessary if the weight value is higher than the threshold.

When the decision at step 1008 is affirmative, a timing operation is started (step 1009) and the timeout period of the timing operation is checked at step 1010. If the timer has expired, the processor proceeds from step 1010 to step 1011 to send an update enquiry message to the server for a reply indicating whether or not an update has been made. If the referrer object has been linked to a new reference object, the reply from the server indicates that an update has occurred (step 1012) and flow proceeds to step 1013 to retrieve the identifier of the reference object (subroutine 1013) and prefetches the data of the retrieved identifier from the server (subroutine 1014) and returns to the starting point of the routine.

Figure 11:
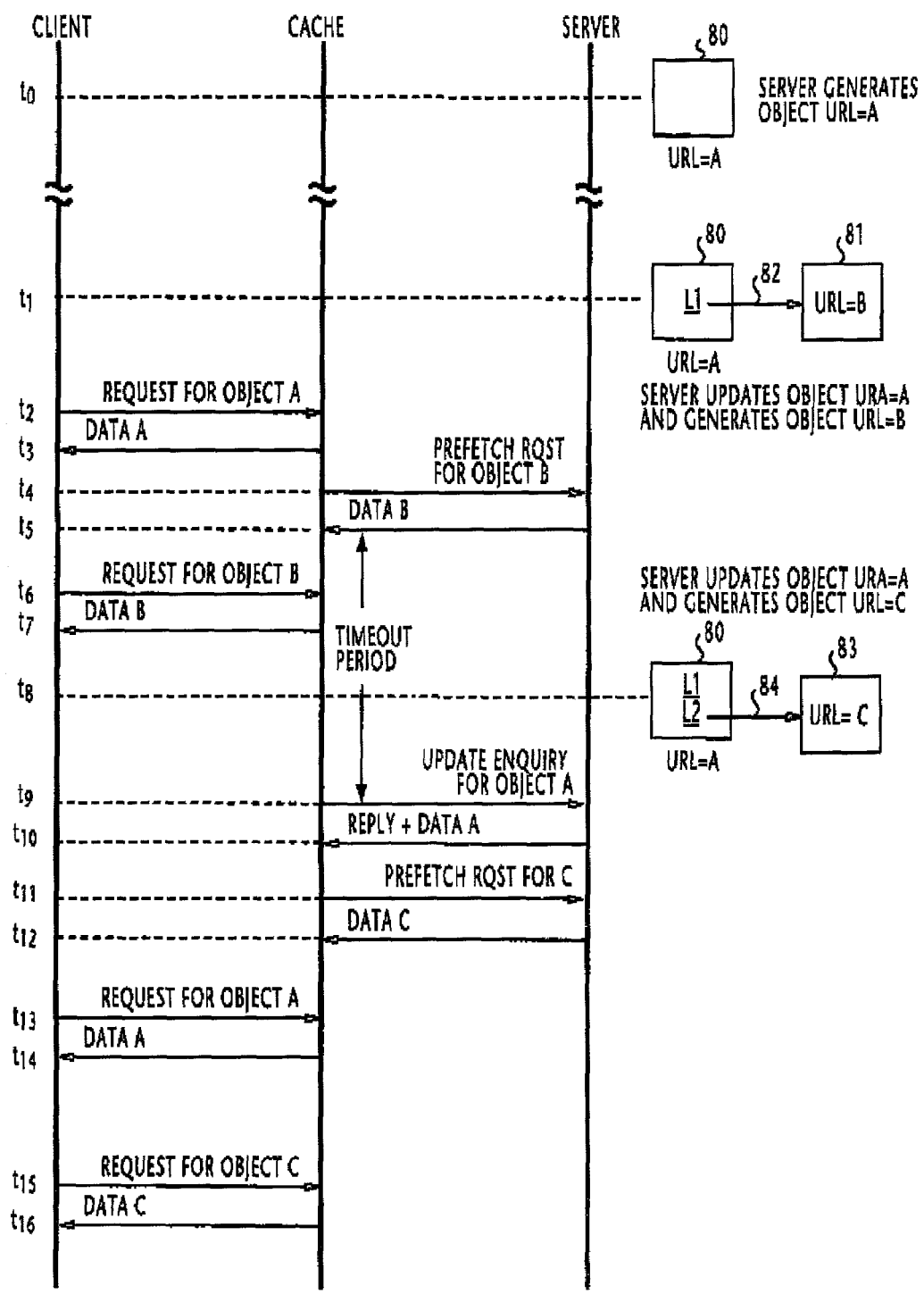
FIG. 11 is a sequence diagram associated with the flowchart of FIG. 10.

FIG. 11 is a time sequence which illustrates the operation of the client, the cache and the server according to the flowchart of FIG. 10.

At time $t_0$, the server creates an object 80 identified by URL=A. At time $t_1$, the server updates the object 80 by linking it to a reference object 81 (URL=B) with a hyperlink 82, establishing a new referrer-reference relationship. If the document A of object 80 has already been loaded into the cache 31 prior to time $t_2$ and if the client sends a request to the cache 31 at this time instant for object 80, the processor instantly retrieves the document A from the cache memory and sends it to the client at time $t_3$ (subroutine 1002) and proceeds to step 1003 to step 1005. If the processor determines that prefetching is required for the reference object 81 (step 1005), it sends a request for the data B of reference object 81 at time $t_4$ and loads it into the cache memory at $t_5$ (subroutines 1006, 1007). If it is determined that update enquiry is required (step 1008), the processor sets a timing interval and initiates a timing action. If a client sends a request for reference object 81 at time $t_6$, the client will receive the prefetched data from the cache instantly ($t_7$). If the server updates the referrer object 80 by establishing a new hyperlink 84 to a reference object 83 (URL=C) at time $t_8$ and the timing action expires at time $t_9$ (step 1010), the cache 31 sends an update enquiry message (step 1011) for data A of object 80 and a reply (plus data A) is received from the server at time $t_{10}$ (step 1012). In response, the cache sends a request to the server for prefetching the data C of reference object 83 at time $t_{11}$ and receives it from the server at time $t_{12}$ (step 1014). If the client requests for data A of object 80 at time $t_{13}$, the cache retrieves it from its memory and sends it to the client ($t_{14}$). If the client subsequently requests the data C of object 83 at time $t_{15}$, it receives the prefetched data C from the cache ($t_{16}$) in a short response time.

If the update enquiry and prefetching operation is not performed, a substantial amount of delay occurs following receipt of a request from the client's for the data C and the client will receive it at the time instant which is much later than time $t_{16}$.

Figure 12:
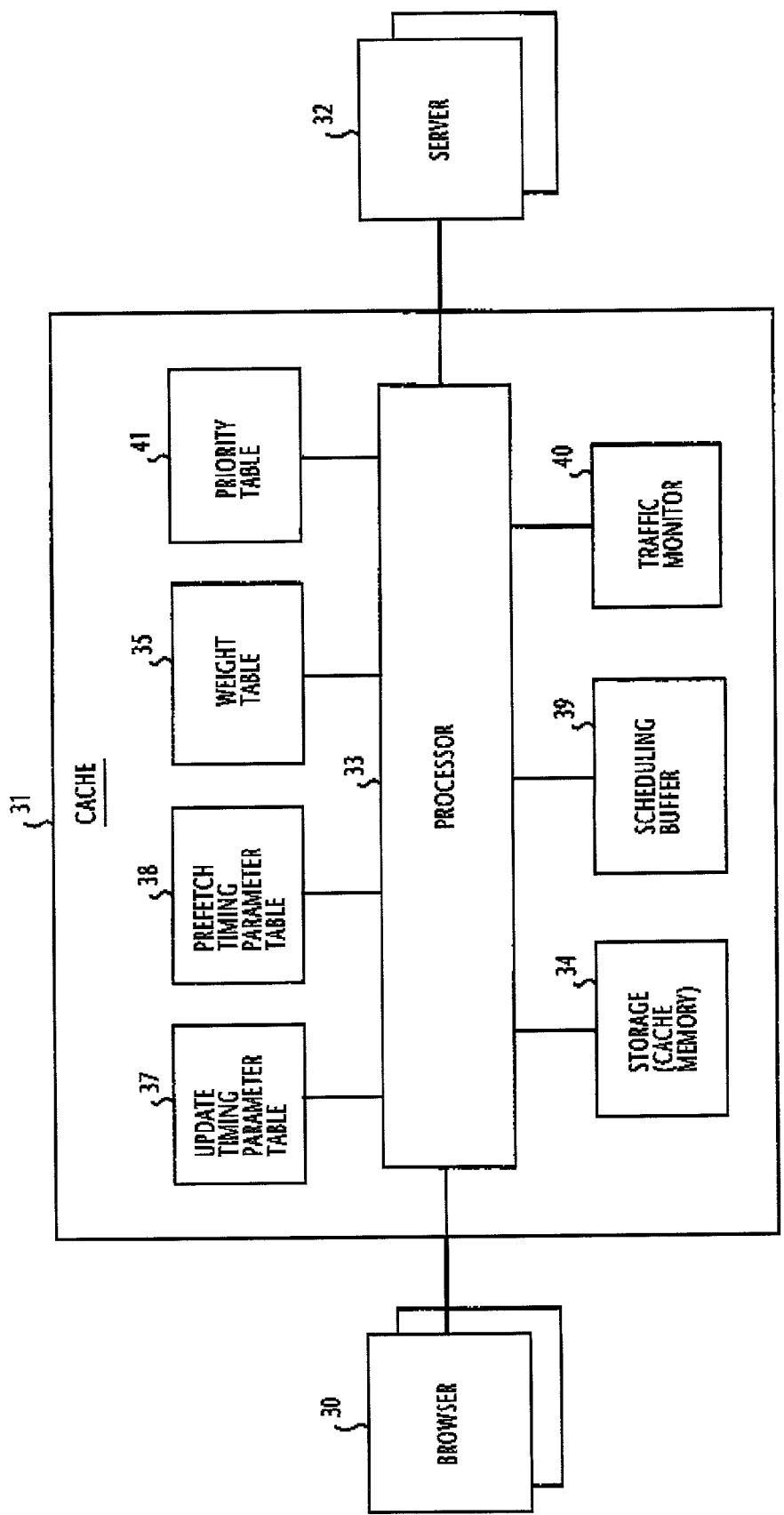
FIG. 12 is a block diagram of the system according to a modified embodiment of the present invention.

In a further embodiment of the present invention prefetching operations are initiated at an instant that is determined based on statistics client's request records. In FIG. 12, the cache additionally includes a update timing parameter table 37, a prefetch timing parameter table 38, a scheduling buffer 39, a traffic monitor 40 and a priority table 41.

Figure 13:
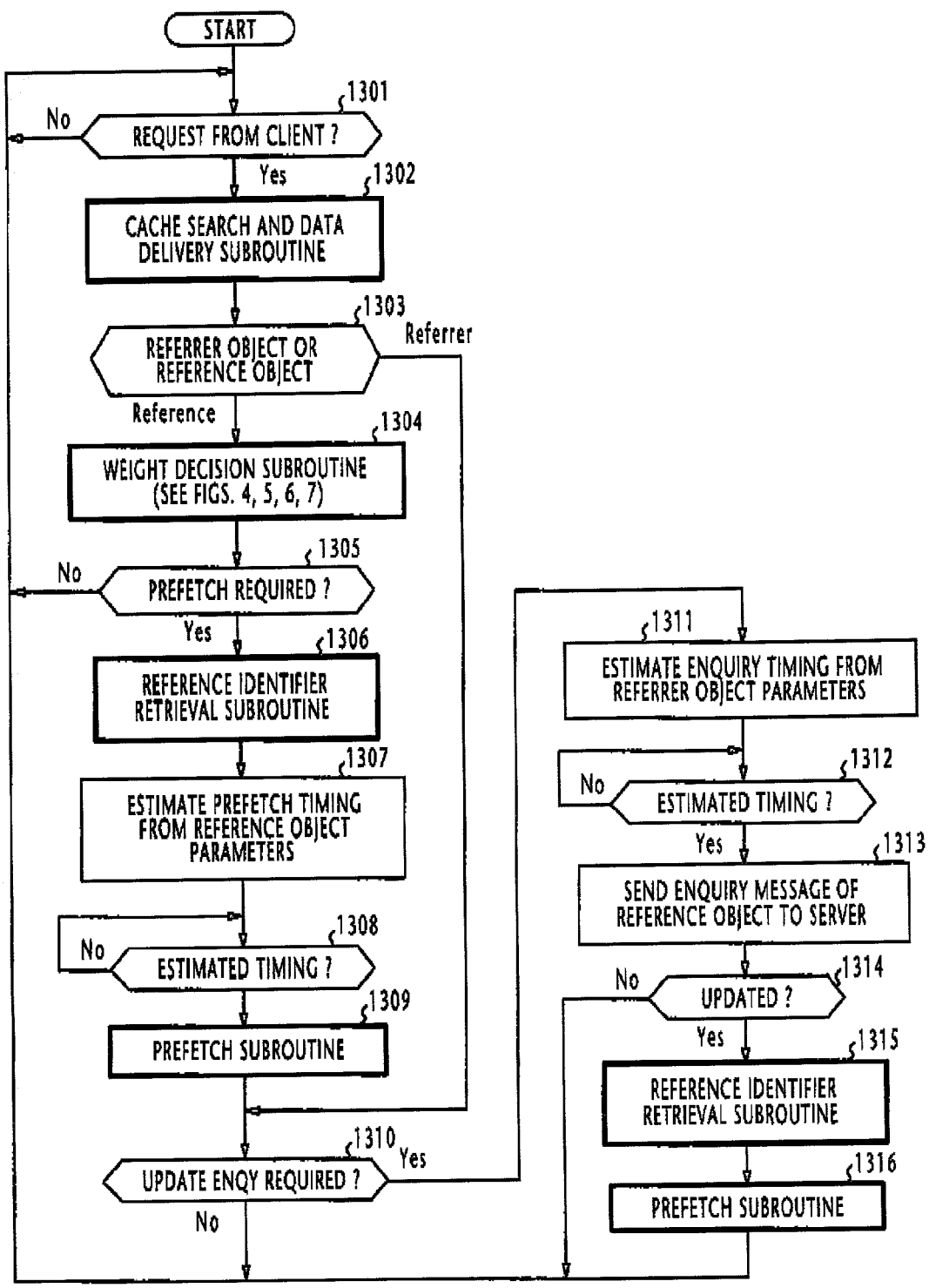
FIG. 13 is a flowchart of the operation of the processor for performing, at scheduled timing, prefetch and update inquiring actions.

The operation of the processor 33 of FIG. 12 proceeds according to the flowchart of FIG. 13.

Processor 33 receives a request from the browser (step 1301) and executes cache search and data delivery subroutine 1302. At step 1303, the processor determines if the client has requested a referrer object or a reference object that can identify its referrer object. If the reference object is detected at step 1303, the processor executes weight decision subroutine 1304, and proceeds to decision step 1305 to determine that prefetching is required if the weight value of its referrer object is higher than a specified threshold. Processor 33 retrieves the identifier of the reference object by executing the reference ID retrieval subroutine 1306.

As will be described later, the processor estimates prefetch timing based on prefetch timing parameters stored in the prefetch timing parameter table 38 and schedules the client's request in a queue of the buffer 39 at 1307. When the estimated timing is reached (step 1308), the processor executes prefetching subroutine 1309.

Following the execution of subroutine 1309, the processor 33 proceeds to decision step 1310 to determine if update enquiry is required using the weight value of the referrer object linked to the reference object.

If a referrer object is detected at step 1303, the processor proceeds to step 1310 to compare its own weight value with a threshold and determines that an update enquiry is necessary if the weight value is higher than the threshold.

As will be described later, the processor estimates update enquiry timing based on update timing parameters stored in the update timing parameter table 37 and schedules the client's request in a queue of the buffer 39 at step 1311. When the estimated timing is reached (step 1312), the processor sends an update enquiry message to the server 32 (step 1313). If the reply from the server indicates that a new hyperlink has been established, the processor determines that an update has occurred (step 1314) and successively executes reference ID retrieval subroutine 1315 and prefetching subroutine 1315.

Processor 33 collects statistics records of time interval from the instant a referrer object is requested to the instant a reference object is requested (i,e., referrer-to-reference transfer time). Processor 33 uses these statistics time interval records to estimate the start timing, the end timing and the retrievable time interval for each client's request and stores them into the table 38 as prefetch timing parameters. The start timing defines the time instant at which a prefetching operation can be started and the end timing defines the time instant at which the prefetching operation must be completed. Preferably, the start timing is in most cases the current time. It is desirable that the cache transmits a prefetch request to the server before it receives a client request or the cache has saved the downloaded data in the cache memory before receiving the client request. Therefore, it is preferable that the start timing corresponds to the instant the client's request is expected to occur or the time instant which is traced back from the expected time instant by an amount equal to the interval taken to retrieve objects from the server.

Figure 14:
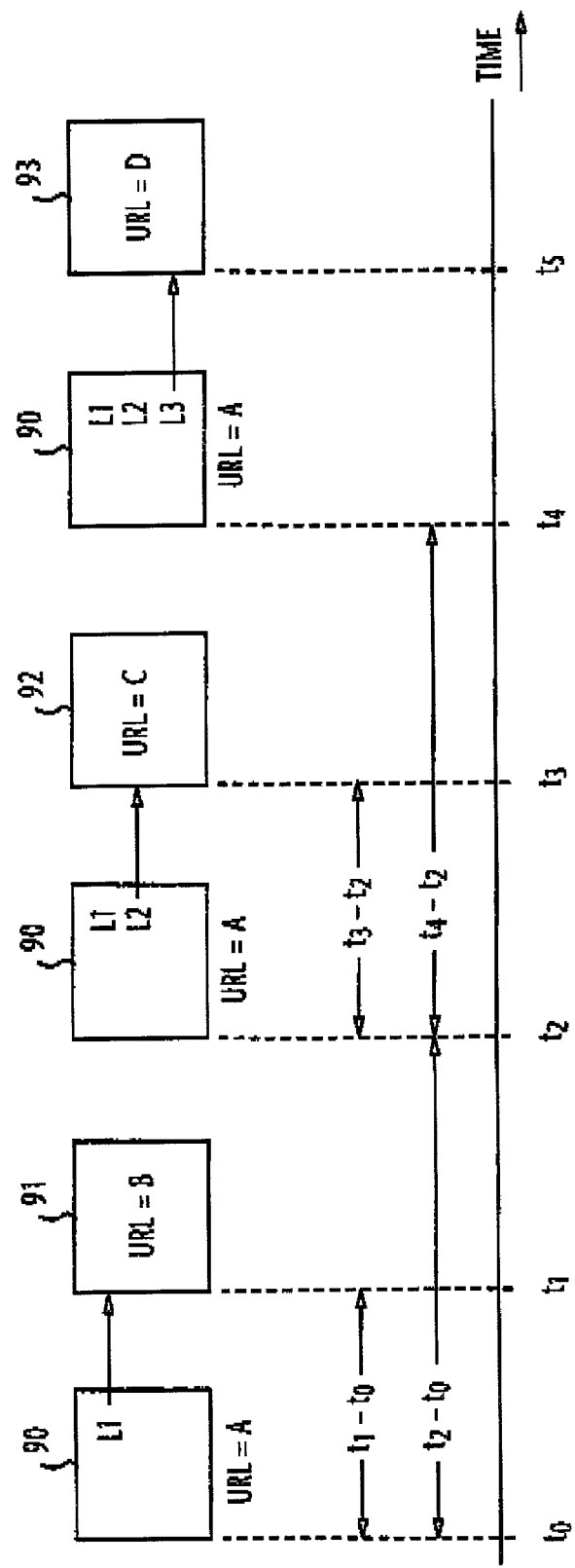
FIG. 14 is a sequence diagram of successively requested objects for estimating their time intervals from past records.

In a typical example shown in FIG. 14, a client request record indicates that an object 90 (URL=A) was requested at time $t_0$ and linked to an object 91 (URL=B) at time $t_1$, and the object 90 was requested again at time $t_2$ and linked to an object 92 (URL=C) at time $t_3$. Based on this client request record, the processor 33 estimates that the time interval T between the instant $t_4$ at which the object 90 will be requested again and the instant $t_5$ at which the object 90 will be linked to an object 93 (URL=D) by averaging the two time intervals, i.e., $T=\{(t_1-t_0)+(t_3-t_2)\}/2$. By subtracting this averaged time interval from the time instant $t_4$, the processor determines the start timing at which the client will request the object 93 (i.e., the instant that is traced back by the retrieval interval from time $t_5$). Since the reference objects are, in most cases, requested during the interval between successive client's accesses to the same referrer object, the end timing (the instant at which a document must be retrieved from the server) can be estimated by averaging the two time intervals $(t_2-t_0)$ and $(t_4-t_2)$, i.e., $\{(t_2-t_0)+(t_4-t_2)\}/2$ and adding this averaged time interval to the time instant $t_4$.

Additionally, the processor 33 collects statistics records of time interval which the cache takes to retrieve web documents from the server. For example, assume that referrer-reference relationships exist as shown in FIG. 5 and there is a record indicating that the reference object 58 was retrieved using the hyperlink 55. Further, the record shows that the time intervals taken to retrieve objects 58 and 59 from the server are YB and YC, respectively. Then, the expected retrieval time of the object 60 can be determined as an average value of these intervals, i.e., (YB+YC)/2.

Processor 33 determines the start timing at which an update enquiry message can be transmitted to the server and the end timing at which the update enquiry must be completed.

The start timing for sending an update enquiry message is determined as follows. If the time at which an update occurs is known in advance, the start timing is determined according to the known timing. For example, if the "expire" specified by RFC2616 as the freshness deadline of a web document is used as an attribute of the object, the start timing is set equal to a sum of the expire timing and a preset interval which is in the range between several seconds and several minutes. If it is known in advance that the server updates a particular object at predetermined intervals, the start timing can be set equal to a sum of this known timing and a preset interval which is in the range between several seconds and several minutes.

The end timing for sending an update enquiry message is determined as follows. It is desirable that when an object has been updated by the server an update enquiry be completed before the client subsequently issues a request to the cache. Processor 33 may collect user's request records respectively for different objects and averages the time intervals between successive client's requests as an expected request interval (AM). The end timing may be set equal to the total value of the expected request interval and the instant (AR) the client requested an object last. Alternatively, the end timing may be set equal to AR+CA×AM, where CA is a coefficient.

Processor 33 stores the estimated start timing end timing and retrieval time intervals of client requests into the update timing parameter table 37 as update timing parameters.

Processor 33 uses the prefetch timing parameters to schedule the transmit timing of prefetch requests and uses the update timing parameters to schedule the transmit timing of update enquiry requests by placing a sequence of such requests in a queue formed in the scheduling buffer 39. Processor 33 discards queued requests when a total sum of data during a given time slot exceeds a predetermined threshold.

Traffic monitor 40 constantly monitors the receive (incoming) traffic to detect the downlnk transmission rate R(i) of total data the cache has received from a number of servers, where i represents the time slot index. SNMP (simple network management protocol) or the like may be used to monitor the server-to-cache traffic. Processor 33 retrieves traffic data R(i) from the traffic monitor 40 and performs a scheduling operation on prefetch requests and update enquiry requests queued in the scheduling buffer 39 using the retrieved traffic data so that the transmit (outgoing) traffic of the cache does not exceed a presettable maximum data size Z(i) which is optimum for each time slot.

Figure 15:
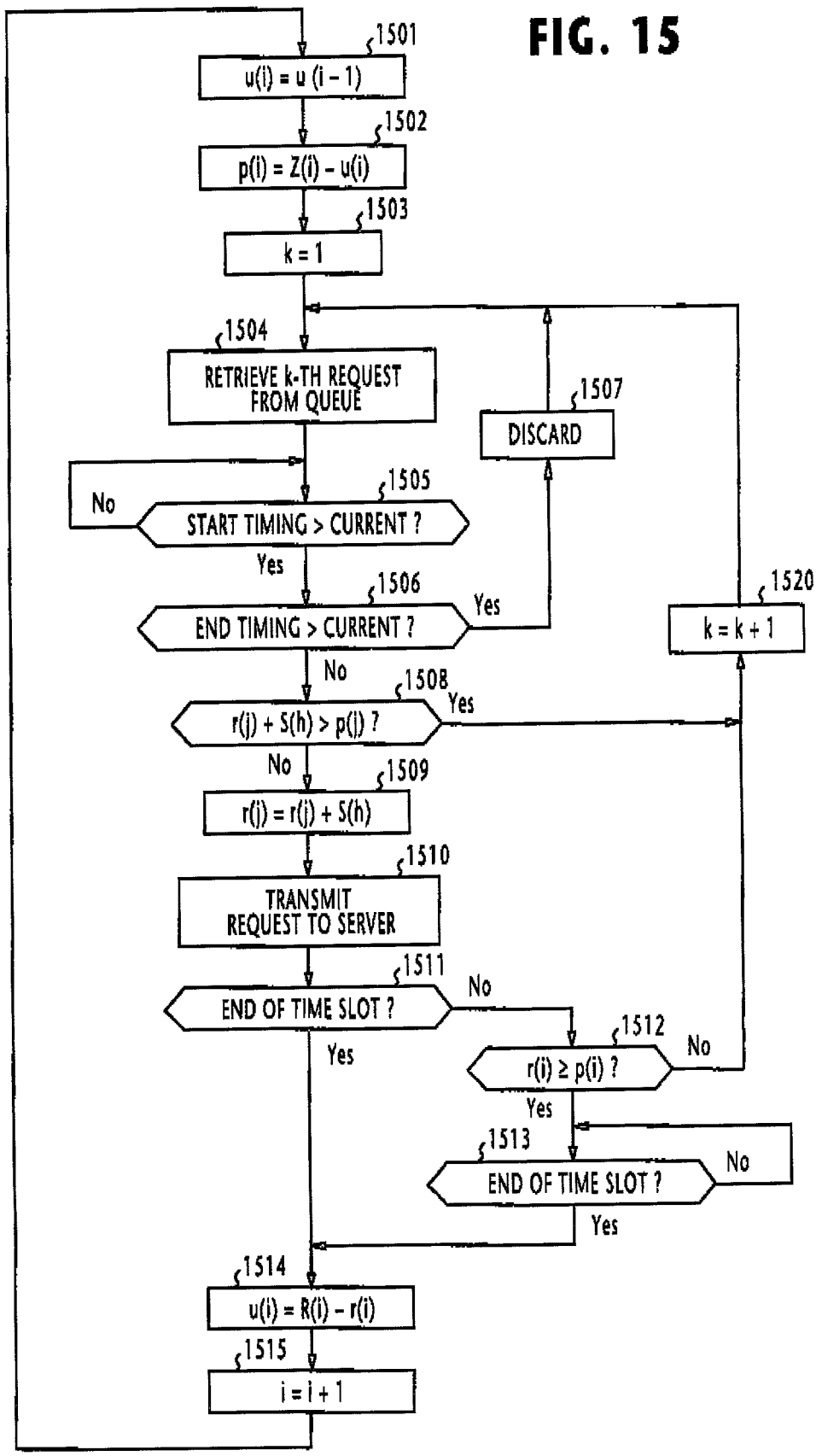
FIG. 15 is a flowchart of the operation of the processor according to the present invention for scheduling queued requests.

For a given file type (h), the scheduling operation of the processor 33 proceeds according to the flowchart of FIG. 15. At time slot (i), the processor estimates the downlink transmission rate u(i) of normal data (excluding prefetch data) from the data rate u(i−1) of the previous time slot. At step 1502, u(i) is subtracted from the maximum data size Z(i) to produce an estimate of prefetchable data size p(i). A variable k which represents the position of a request in the queue is initialized to 1 (step 1503). A request for the given file type (h) is retrieved from the first position of the queue (step 1504). At step 1505, the processor checks to see if the estimated transmit end timing of this request is later than the current time, If so, this request is discarded (step 1506) and the variable k is incremented by one at step 1507 and flow returns to step 1504 to repeat the process on the request of the next queue position.

If the end timing of the request is earlier than the current time, flow proceeds from step 1505 to decision step 1508 to make a decision as to whether or not the total data size r(j) at time instant (j) of requests already transmitted during the time slot (i) is greater than the prefetchable data size p(j). Note that the time instant j is equal to (t+estimated retrieval interval)/T, where t is the instant a prefetch request or update enquiry message is transmitted and T is the interval of the time slot i. At step 1508, the processor 33 makes this decision by summing r(j) and S(h) and comparing the sum with the prefetchable data size p(j), where S(h) is a predetermined data size of the file type (h).

If the prefetchable data size p(i) is not exceeded, flow proceeds to step 1509 to update the transmitted total data size r(j) with the file size S(h). If the prefetchable data size p(j) is exceeded, flow proceeds to step 1520 to shift the position of the buffer to the next and returns to step 1504.

At step 1510, the processor 33 sends a request to the server 32 to download the requested data of size S(h) from the server. Processor 33 monitors the current time to determine if it corresponds to the end of the current time slot (step 1511). If the decision is negative, flow proceeds to step 1512 to determine if the requested total data size r(i) is equal to or greater than the prefetchable size p(i). If not flow returns to step 1520 to repeat the process on the next request. If r(i)≧p(i), flow proceeds from step 1512 to step 1513 to wait until the end of the current time slot.

If the decision at step 1511 or 1513 is affirmative, the processor advances to step 1514 to retrieve the normal traffic data R(i) from the traffic monitor and updates the estimated transmission rate u(i) by subtracting the size r(i) of data requested during time slot (i) from the retrieved data rate R(i). At step 1515, the time slot is incremented by one and flow returns to step 1501 to repeat the routine on the next time slot.

Priority table 41 shown in FIG. 12 is used to store priority data of requests. Requests are assigned to different priorities which are determined by IP addresses or FQDN (fully qualified domain name) identifiers. Processor 33 reads the priority data from the priority table 41 and arranges the requests queued in the scheduling buffer 40 according to their priority levels so that requests of higher priorities are read earlier than those of lower priorities.

What is claimed is:

1. A method of operating a cache, comprising the steps of:
   a) determining a weight value of a first object maintained in the cache, said first object having a link to a second object maintained in a server;
   b) making a decision as to whether prefetching is necessary based on said weight value; and
   c) if the decision of step (b) indicates that prefetching is necessary, prefetching said second object from said server.

2. The method of claim 1, wherein step (b) comprises making a decision that said prefetching is necessary if said weight value is higher than a predetermined value.

3. The method of claim 1, wherein step (a) comprises incrementing said weight value in response to a request from a client device.

4. The method of claim 3, wherein said request contains an identifier and ancillary information, said identifier identifying said first object.

5. The method of claim 1, wherein step (a) comprises determining said weight value from a count number of different links through which said first object is linked to a plurality of second objects maintained in said server.

6. The method of claim 1, wherein step (b) comprises:
   determining ranks of weight values of a plurality of objects maintained in said cache, said plurality of objects including said first object, wherein the rank of the first object represents said weight value; and
   making said decision based on the rank of said first object relative to a predetermined rank.

7. The method of claim 1, wherein step (a) comprises:
   retrieving an identifier of said second object maintained in said cache;
   identifying an object associated with said retrieved identifier as said first object; and
   incrementing the weight value of the first object,
   wherein step (b) comprises:
   determining ranks of weight values of a plurality of objects maintained in said cache, said plurality of objects including said first object, wherein the rank of the first object represents said weight value; and
   making said decision based on the rank of said first object relative to a predetermined rank.

8. The method of claim 1, wherein step (c) comprises:
   mapping identifiers of a plurality of objects maintained in said server to a plurality of objects maintained in said cache in a management table;
   comparing identifier of said second object with each of the identifiers of said objects maintained in said cache;
   prefetching said second object from said server if the identifier of said second object do not coincide with any of the identifiers of said objects maintained in said cache; and
   updating said management table by mapping the identifier of said second object to said first object.

9. The method of claim 1, wherein step (c) comprises the steps of:
   estimating a timing parameter in response to a request from said client device based on client-server information records;
   storing a plurality of said requests in a buffer;
   scheduling the stored requests according to the respective timing parameters of the requests and data size of said requests so that a total data size of said requests during a predetermined time interval does not exceed a predetermined size; and
   prefetching data of said scheduled requests from said server.

10. The method of claim 9, wherein the step of estimating comprises the steps of:
    estimating start timing at which the prefetching of said data can be started based on said client-server information records;
    estimating end timing at which the prefetching of said data must be completed based on said client-server information records;
    estimating a time interval required to retrieve said data from said server based on said client-server information records; and
    estimating said timing parameter using at least one of said estimated start timing, said estimated end timing and said estimated time interval.

11. The method of claim 9, wherein the step of scheduling comprises monitoring a data rate of total downlink transmissions and additionally scheduling the stored requests according to the monitored data rate.

12. The method of claim 1, wherein step (c) comprises the steps of:
    estimating update enquiry timing for an object of a request from said client device;
    storing a plurality of requests in a buffer according to the estimated update enquiry timing;
    scheduling the stored requests according to data size of the requests so that a total data size of a time slot does not exceed a predetermined size; and
    sending said update enquiry message to said server during said time slot.

13. The method of claim 12, wherein the step of estimating comprises the steps of:

estimating start timing at which said update enquiry message can be transmitted based on said client-server information records;

estimating end timing at which said update reply message must be received based on said client-server information records;

estimating a time interval required to receive said reply message from said server based on said client-server information records; and estimating said timing parameter using at least one of said estimated start timing, said estimated end timing and said estimated time interval.

14. The method of claim 12, wherein the step of scheduling comprises monitoring a data rate of total downlink transmissions and additionally scheduling the stored requests according to the monitored data rate.

15. The method of claim 12, wherein the step of scheduling further comprises scheduling the stored requests according to priorities of said requests.

16. The method of claim 1, wherein step (c) comprises the steps of:

$c_1$) estimating a timing parameter for a prefetch request in response to a request from said client device based on client-server information records;

$c_2$) storing a plurality of said prefetch requests in sequential positions of a buffer;

$c_3$) reading a given prefetch request from a position of said buffer during a time interval of a predetermined length;

$c_4$) examining the timing parameter of said given prefetch request and discarding the given prefetch request if the timing parameter thereof indicates that current time has past;

$c_5$) producing a sum of a data size of the given prefetch request plus a data size of prefetch requests which have been transmitted to said server;

$c_6$) shifting the position of the buffer and returning to step ($c_3$) if said sum exceeds a predetermined data size; and $c_7$) transmitting the given prefetch request to the server if said sum does not exceed said predetermined data size, shifting the position of the buffer and repeating steps ($c_3$) to ($c_6$).

17. The method of claim 16, further comprising the steps of:

monitoring downlink transmissions and detecting data rate of the monitored downlink transmissions; and estimating said predetermined data size from the detected data rate.

18. A method of operating a cache, comprising the steps of:

a) determining a weight value of a first object maintained in said cache, said first object having a link to a second object maintained in a server;

b) making a decision as to whether update enquiry is necessary based on said weight value; and c) if the decision of step (b) indicates that update enquiry is necessary, sending an update enquiry message to said server and receiving a reply message therefrom; and d) prefetching said second object from said server if said reply message indicates that said first object has been updated.

19. The method of claim 18, wherein step (d) further comprises:

retrieving an identifier of said second object maintained in said cache;

identifying an object associated with said retrieved identifier as said first object; and prefetching said second object according to the retrieved identifier.

20. The method of claim 18, wherein step (b) comprises making a decision that said update enquiry is necessary if said weight value is higher than a predetermined value.

21. The method of claim 18, wherein step (a) comprises incrementing said weight value in response to a request from a client device.

22. The method of claim 21, wherein said request contains an identifier and ancillary information, said identifier identifying said first object.

23. The method of claim 18, wherein step (a) comprises determining said weight value from a count number of different links through which said first object is linked to a plurality of second objects maintained in said server.

24. The method of claim 18, wherein step (b) comprises:

determining ranks of weight values of a plurality of objects maintained in said cache, said plurality of objects including said first object, wherein the rank of the first object represents said weight value; and making said decision based on the rank of said first object relative to a predetermined rank.

25. The method of claim 18, wherein step (a) comprises:

retrieving an identifier of said second object maintained in said cache;

identifying an object associated with said retrieved identifier as said first object; and incrementing the weight value of the first object, wherein step (b) comprises:

determining ranks of weight values of a plurality of objects maintained in said cache, said plurality of objects including said first object, wherein the rank of the first object represents said weight value; and making said decision based on the rank of said first object relative to a predetermined rank.

26. The method of claim 18, wherein step (c) comprises:

mapping identifiers of a plurality of objects maintained in said server to a plurality of objects maintained in said cache in a management table;

comparing identifier of said second object with each of the identifiers of said objects maintained in said cache;

prefetching said second object from said server if the identifier of said second object do not coincide with any of the identifiers of said objects maintained in said cache; and updating said management table by mapping the identifier of said second object to said first object.

27. The method of claim 18, wherein step (c) comprises the steps of:

introducing a presettable delay time; and following said delay time, sending said update enquiry message to said server and receiving said reply message therefrom.

28. The method of claim 18, wherein said presettable delay time is an estimated time interval from records of requests received from the client device.

29. The method of claim 9, wherein step (c) comprises the steps of;

$c_1$) estimating a timing parameter for an update enquiry request in response to a request from said client device based on client-server information records;

$c_2$) storing a plurality of said an update enquiry requests in sequential positions of a buffer;

$c_3$) reading a given an update enquiry request from a position of said buffer during a time interval of a predetermined length;

c₄) examining the timing parameter of said given update enquiry request and discarding the given update enquiry request if the timing parameter thereof indicates that current time has past;

c₅) producing a sum of a data size of the given update enquiry request plus a data size of update enquiry requests which have been transmitted to said server;

c₆) shifting the position of the buffer and returning to step (c₃) if said sum exceeds a predetermined data size; and c₇) transmitting the given update enquiry request to the server if said sum does not exceed said predetermined data size, shifting the position of the buffer and repeating steps (c₃) to (c₆).

30. The method of claim 29, further comprising the steps of:

monitoring downlink transmissions and detecting data rate of the monitored downlink transmissions; and estimating said predetermined data size from the detected data rate.

31. A method of operating a cache, comprising the steps of:

a) responsive to a first request from a client device, making a decision as to whether prefetching is necessary based on a weight value of a first object maintained in said cache, said first object having a link to a second object maintained in a server;

b) if the decision of step (a) indicates that prefetching is necessary, prefetching said second object from said server;

c) incrementing said weight value in response to a second request from said client device;

d) making a decision as to whether prefetching is necessary based on said weight value;

e) if the decision of step (e) indicates that prefetching is necessary, prefetching said second object from said server; and f) repeating steps (a) to (e).

32. A system comprising:

a cache; and a processor for determining a weight value of a first object maintained in said cache, said first object having a link to a second object maintained in a server, making a decision as to whether prefetching is necessary based on said weight value, and prefetching said second object from said server if said decision indicates that prefetching is necessary.

33. The system of claim 32, wherein the processor makes a decision that said prefetching is necessary if said weight value is higher than a predetermined value.

34. The system of claim 32, wherein the processor increments said weight value in response to a request from a client device.

35. The system of claim 34, wherein said request contains an identifier identifying said first object and ancillary information.

36. The system of claim 32, wherein the processor determines said weight value from a count number of different links through which said first object is linked to a plurality of second objects maintained in said server.

37. The system of claim 32, wherein the processor determines ranks of weight values of a plurality of objects maintained in said cache, said plurality of objects including said first object, wherein the rank of the first object represents said weight value, and makes said decision based on the rank of said first object relative to a predetermined rank.

38. The system of claim 32, wherein the processor is arranged to:

retrieve an identifier of said second object maintained in said cache, identify an object associated with said retrieved identifier as said first object, increment the weight value of the first object, determine ranks of weight values of a plurality of objects maintained in said cache, said plurality of objects including said first object, wherein the rank of the first object represents said weight value, and makes said decision based on the rank of said first object relative to a predetermined rank.

39. The system of claim 32, wherein the processor is arranged to:

map identifiers of a plurality of objects maintained in said server to a plurality of objects maintained in said cache in a management table, compare identifier of said second object with each of the identifiers of said objects maintained in said cache, prefetch said second object from said server if the identifier of said second object do not coincide with any of the identifiers of said objects maintained in said cache; and update said management table by mapping the identifier of said second object to said first object.

40. The system of claim 32, wherein the processor is arranged to:

determine a weight value of a first object maintained in said cache, said first object having a link to a second object maintained in a server;

make a decision as to whether update enquiry is necessary based on said weight value; and if the decision of step (b) indicates that update enquiry is necessary, send an update enquiry message to said server and receiving a reply message therefrom, and prefetch said second object from said server if said reply message indicates that said first object has been updated.

41. A computer readable storage medium containing an executable program comprising the steps of:

a) determining a weight value of a first object maintained in a cache, said first object having a link to a second object maintained in a server;

b) making a decision as to whether prefetching is necessary based on said weight value; and c) if the decision of step (b) indicates that prefetching is necessary, prefetching said second object from said server.

42. A computer readable storage medium containing an executable program comprising the steps of:

a) determining a weight value of a first object maintained in said cache, said first object having a link to a second object maintained in a server;

b) making a decision as to whether update enquiry is necessary based on said weight value; and c) if the decision of step (b) indicates that update enquiry is necessary, sending an update enquiry message to said server and receiving a reply message therefrom; and d) prefetching said second object from said server if said reply message indicates that said first object has been updated.

43. A computer readable storage medium containing an executable program comprising the steps of:

a) responsive to a first request from a client device, making a decision as to whether prefetching is necessary based on a weight value of a first object maintained in said cache, said first object having a link to a second object maintained in a server;

b) if the decision of step (a) indicates that prefetching is necessary, prefetching said second object from said server;
c) incrementing said weight value in response to a second request from said client device;
d) making a decision as to whether prefetching is necessary based on said weight value;
e) if the decision of step (e) indicates that prefetching is necessary, prefetching said second object from said server; and
f) repeating steps (a) to (e).

* * * * *